United States Patent
Ha et al.

(10) Patent No.: US 11,316,407 B2
(45) Date of Patent: Apr. 26, 2022

(54) GENERATOR

(71) Applicant: LG ELECTRONICS INC., Seoul (KR)

(72) Inventors: Seunghyoung Ha, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/002,886

(22) Filed: Aug. 26, 2020

(65) Prior Publication Data

US 2021/0067003 A1 Mar. 4, 2021

(30) Foreign Application Priority Data

Aug. 30, 2019 (KR) .......................... 10-2019-0107604

(51) Int. Cl.
| | |
|---|---|
| *H02K 9/06* | (2006.01) |
| *H02K 7/02* | (2006.01) |
| *H02K 7/075* | (2006.01) |
| *H02K 7/18* | (2006.01) |

(52) U.S. Cl.
CPC ................. *H02K 9/06* (2013.01); *H02K 7/02* (2013.01); *H02K 7/075* (2013.01); *H02K 7/1815* (2013.01)

(58) Field of Classification Search
CPC ........... H02K 7/02; H02K 7/075; H02K 7/18; H02K 1/20; H02K 1/30; H02K 1/32; H02K 9/06; H02K 7/1815
See application file for complete search history.

(56) References Cited

U.S. PATENT DOCUMENTS

| | | | | |
|---|---|---|---|---|
| 6,561,336 | B1* | 5/2003 | Huart | B60K 6/26 |
| | | | | 192/70.252 |
| 2008/0238219 | A1* | 10/2008 | Hoshino | H02K 1/274 |
| | | | | 310/400 |
| 2013/0154408 | A1* | 6/2013 | Satou | B60L 3/0061 |
| | | | | 310/61 |
| 2016/0308418 | A1* | 10/2016 | Garvey | H02K 5/163 |
| 2016/0339997 | A1 | 11/2016 | Crain et al. | |

FOREIGN PATENT DOCUMENTS

JP 2005-117807 4/2005

OTHER PUBLICATIONS

European Search Report dated Jan. 11, 2021 issued in Application No. 20193114.4.

* cited by examiner

*Primary Examiner* — Naishadh N Desai
(74) *Attorney, Agent, or Firm* — Ked & Associates LLP

(57) ABSTRACT

Provided is a generator that converts mechanical energy transmitted through a rotation shaft perpendicularly coupled to a flywheel as an output shaft of an engine into electrical energy. The generator includes: a rotor coupled to the rotation shaft and rotated together when the rotation shaft is rotated; and a stator which has an inner surface positioned adjacent to an outer surface of the rotor and is wound around with a coil, wherein the engine includes: a plurality of blades installed in a side surface of the flywheel facing the rotor and rotated together with the flywheel when the rotation shaft is rotated; and an engine bracket which has a through hole through which the rotation shaft passes, has one side that is opened to accommodate the flywheel therein, and is coupled to the stator, wherein the engine bracket forms an air flow path for guiding air flowed into the flywheel through an inside of the rotor to the stator, when the plurality of blades are rotated.

15 Claims, 7 Drawing Sheets

GENERATOR

CROSS-REFERENCE TO RELATED APPLICATION

This application claims the priority from Korean Patent Application No. 10-2019-0107604, filed on Aug. 30, 2019, in the Korean Intellectual Property Office, the disclosure of which is incorporated herein by reference in its entirety.

BACKGROUND OF THE INVENTION

1. Field of the Invention

The present disclosure relates to a generator, and more particularly, to a generator capable of directly and effectively removing heat generated in a stator by blowing a cooling air into the stator in response to the rotation of an engine output shaft.

2. Description of the Related Art

In general, a generator is an apparatus that receives mechanical energy from an external power source and converts the mechanical energy into electrical energy. Here, the external power source may be a turbine, a water wheel, an electric motor, a gas engine, or the like.

When the external power source of the generator is a gas engine, the reciprocating motion of a piston of the gas engine may be converted into a rotational motion by a crankshaft connected to a connecting rod. In addition, when the generator is provided separately from the gas engine, the rotation shaft of the generator connected to a crankshaft pulley by a belt rotates a rotor to induce a current in a coil wound on a stator, so that the generator can generate power.

Such a generator may have a heat generation problem due to the loss of the generator (including copper loss, mechanical loss, iron loss, permanent magnet loss, etc.). That is, when heat generated in each component of the generator is not discharged to the outside but stays inside the generator, it may cause the burn-out of generator or the deterioration of the generator performance.

The generator according to the related art has a fully enclosed housing, but indirectly removes heat generated in each component of the generator, including in the stator, by flowing air to the outside of the housing using a fan. However, such a cooling method cannot effectively remove the heat generated in the generator.

Accordingly, Japanese Patent Laid-Open Publication No. 2005-117807 discloses a technology for removing heat generated in a stator through air flowing through a ventilation hole formed in a rotor of a generator installed in a flywheel side of an engine and an exhaust hole formed in a flywheel housing. However, the above-mentioned Japanese Patent Publication discloses only the ventilation hole and the exhaust hole, and has no configuration such as a fan or a blade that causes the flow of air passing through the ventilation hole and the exhaust hole. Therefore, there is a possibility that hot air cannot be discharged to the outside and stays in the ventilation hole and the exhaust hole.

In addition, in the above mentioned Japanese Patent Publication, in order to install the generator in the flywheel side, a process of installing a separate support coupled to the flywheel housing in the outer side of the stator must be accompanied. However, it takes cost and time to separately manufacture the support, and the stator may be damaged during the process of installing the support in the stator.

SUMMARY OF THE INVENTION

A first problem to be solved by the present disclosure is to provide a generator capable of directly removing heat generated in each component of a generator, including in a stator.

A second problem to be solved by the present disclosure is to provide a generator in which the flow of air for cooling the generator can be achieved in response to the rotation of an engine output shaft that transfers mechanical energy to the generator.

A third problem to be solved by the present disclosure is to provide a generator that can be integrally coupled without having a separate support in one side of an engine that provides mechanical energy.

The present disclosure relates to a generator that converts mechanical energy transmitted through a rotation shaft perpendicularly coupled to a flywheel as an output shaft of an engine into electrical energy.

In accordance with an aspect of the present disclosure, the generator includes: a rotor coupled to the rotation shaft and rotated together when the rotation shaft is rotated; and a stator which has an inner surface positioned adjacent to an outer surface of the rotor and is wound around with a coil, wherein the engine includes: a plurality of blades installed in a side surface of the flywheel facing the rotor and rotated together with the flywheel when the rotation shaft is rotated; and an engine bracket which has a through hole through which the rotation shaft passes, has one side that is opened to accommodate the flywheel therein, and is coupled to the stator, wherein the engine bracket forms an air flow path for guiding air flowed into the flywheel through an inside of the rotor to the stator, when the plurality of blades are rotated. Accordingly, the heat generated in the stator can be directly and effectively removed by the cooling air.

The generator further includes: a first end plate installed in a side surface of the rotor opposite to a side surface facing the flywheel; and a second end plate installed in the side surface of the rotor facing the flywheel, wherein the rotor includes: a rotor core formed in a cylindrical shape and having a plurality of rotor slots formed in a circumferential direction; and a plurality of magnets inserted into the plurality of rotor slots, wherein the second end plate is coupled to the rotation shaft.

The first end plate has an inner diameter and an outer diameter that are formed respectively in a ring shape corresponding to each of the inner and outer diameters of the rotor core, wherein the second end plate includes: a body of circular plate type whose diameter corresponds to the outer diameter of the rotor core; and a plurality of suction holes formed by penetrating the body of circular plate type in a direction corresponding to a longitudinal direction of the rotation shaft so that the air flowed into the flywheel passes when the plurality of blades are rotated.

The engine bracket includes; a bracket body having one side that is open and the other side in which the through hole is formed; and a plurality of connectors which are protruded respectively from an inner surface of the bracket body toward the inside, coupled to the stator, and spaced apart from each other by a certain distance in a circumferential direction of the bracket body.

Each of the plurality of connectors has a coupling pore to which the stator is coupled, an inflow port through which air blown from the plurality of blades is introduced, and a discharge port for discharging the air introduced through the inflow port to the stator.

The stator includes: a stator core having a stator slot which is wound around with the coil; and a stator yoke positioned in an outside of the stator slot and forming an outer circumference, wherein the stator yoke has a coupling hole which is coupled to the coupling pore is formed at a portion facing the connector.

The stator yoke includes: a first yoke that is a portion facing the connector and has the coupling hole formed therein; and a second yoke that is a portion excluding the first yoke, wherein the first yoke has a yoke hole, formed therein, that passes through the first yoke in a longitudinal direction of the first yoke and communicates with the discharge port.

The second yoke has a plurality of fins protruding outwardly that are formed on an outer surface, and each of the plurality of fins is extended in a longitudinal direction of the second yoke and positioned to be spaced apart from each other by a certain interval in a circumferential direction of the second yoke.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Advantages and features of the present disclosure and methods for achieving them will be made clear from the embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. Like reference numerals refer to like elements throughout the specification.

Figure 1:
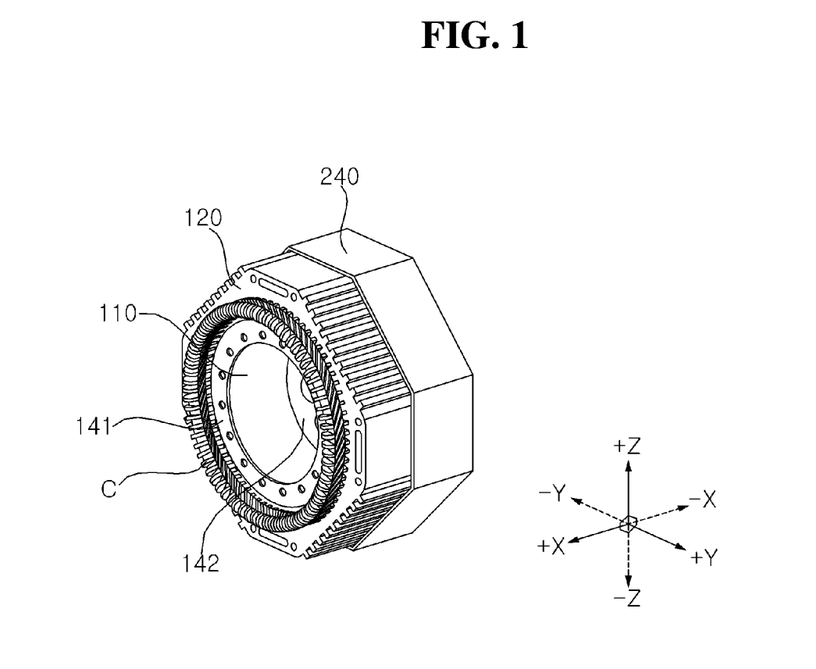
FIG. 1 is a perspective view of a generator coupled to one side of an engine according to an embodiment of the present disclosure.

The present disclosure may be described based on a space orthogonal coordinate system by X-axis, Y-axis and Z-axis that are orthogonal to each other shown in FIG. 1, and the like. In this specification, the X-axis, Y-axis, and Z-axis are defined with a vertical direction as the Z-axis direction and a front-rear direction as the X-axis direction. Each axis direction (X axis direction, Y axis direction, Z axis direction) means both directions in which each axis extends. The '+' sign in front of each axis direction (+X-axis direction, +Y-axis direction, +Z-axis direction) means a positive direction which is one of both directions in which each axis extends. The '−' sign in front of each axis direction (−X-axis direction, −Y-axis direction, −Z-axis direction) means a negative direction which is the other direction of both directions in which each axis extends.

The present disclosure relates to a generator that receives mechanical energy from an external power source and converts it into electrical energy, and an engine may be exemplified as an external power source. In this case, thermal energy generated by the combustion reaction between fuel and air in the cylinder of the engine is converted into mechanical energy that is a linear reciprocating motion of a piston. In addition, the reciprocating motion of the piston as mechanical energy is converted into rotational motion by a crankshaft connected to a connecting rod. At this time, the reciprocating motion of the piston is discontinuous, but the rotational motion of the crankshaft may be evenly performed by a flywheel coupled perpendicularly to the crankshaft.

The generator may receive mechanical energy through the crankshaft (hereinafter, referred to as a rotation shaft) as an output shaft of the engine and convert it into electrical energy. However, the external power source is not limited to the engine configured as described above, and obviously, other devices that generate power may provide mechanical energy to the generator.

In the present disclosure, the generator may generate electric power by inducing a current in a coil wound around the stator by rotating the rotor by the rotation shaft of the engine. Such a generator may have a heat generation problem due to the loss of the generator (including copper loss, mechanical loss, iron loss, permanent magnet loss, etc.). That is, when heat generated in each component of the generator is not discharged to the outside and stays inside the generator, it may cause the burn out of the generator or the deterioration of the generator performance.

Accordingly, the present disclosure is devised to propose a structure for effectively removing heat generated in each component of a generator including bearing, which will be described in more detail later.

Hereinafter, a generator according to an embodiment of the present disclosure will be described in more detail with reference to FIGS. 1 to 7.

FIG. 1 is a perspective view of a generator coupled to one side of an engine according to an embodiment of the present disclosure.

Referring to FIG. 1, a generator 100 is coupled to one side of an engine 200 via an engine bracket 240. The generator 100 includes a rotor 110 and a stator 120.

The rotor 110 is positioned in a center of the generator 100, and first and second end plates 141 and 142 are coupled to one side and the other side so that a magnet 112 provided in the rotor 110 can be prevented from being separated to the outside. The stator 120 has an inner surface adjacent to the outer surface of the rotor 110, and may be wound around with a coil C.

The rotor 110 may be formed in a cylindrical shape as a whole, and the stator 120 may be formed in a shape in which an outer surface forms an octagonal surface and an inner surface forms a curved surface, but the shape of the rotor 110 and the stator 120 is not limited thereto.

As described above and below, a rotation shaft 210 of the engine 200 rotates the rotor 110 to induce a current in the coil C wound around the stator 120 to generate electric power. And, in order to remove heat generated from each component of the generator 100 including the stator 120 during the energy conversion process, a blade 230 installed in a flywheel 220 coupled to the rotation shaft 210 may cause a flow of air passing through the stator 120.

Figure 2:
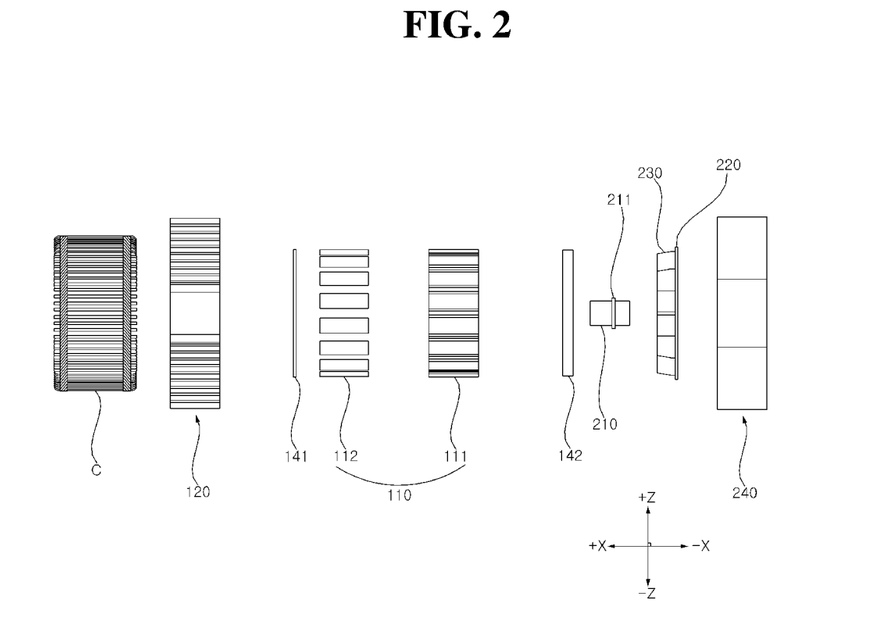
FIG. 2 is an exploded side view of a generator and one side of an engine coupled thereto according to an embodiment of the present disclosure.
Figure 3:
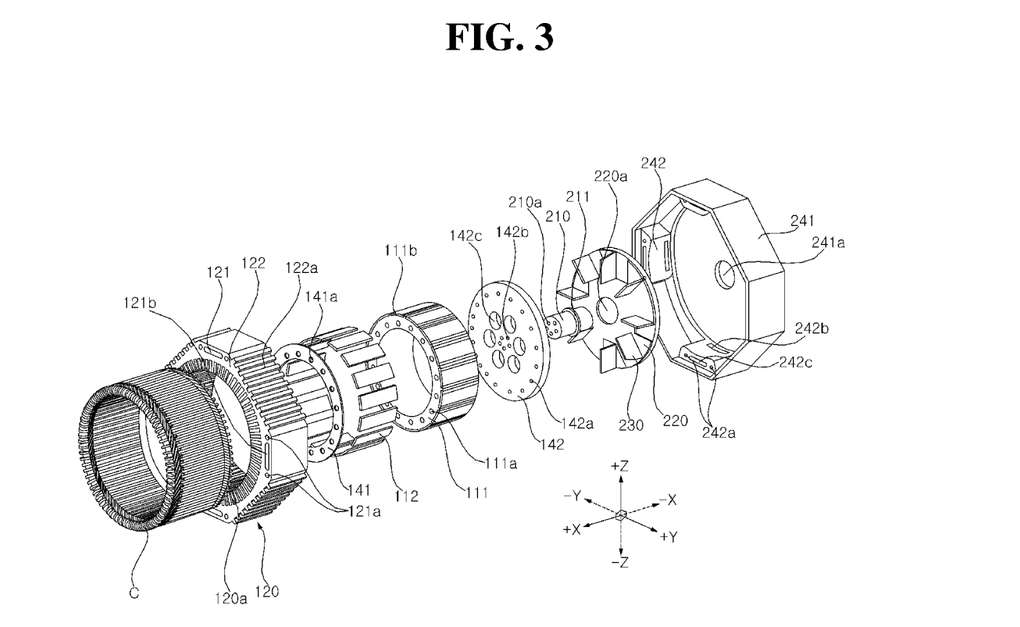
FIG. 3 is an exploded perspective view of a generator and one side of an engine coupled thereto according to an embodiment of the present disclosure.

FIG. 2 is an exploded side view of a generator and one side of an engine coupled thereto according to an embodiment of the present disclosure, and FIG. 3 is an exploded perspective view of a generator and one side of an engine coupled thereto according to an embodiment of the present disclosure.

Referring to FIGS. 2 and 3, the rotor 110 is coupled to the rotation shaft 210 in which the flywheel 220 is vertically coupled in one direction (i.e., in the −X axis direction), so that it can be rotated together with the rotation shaft 210 when the rotation shaft 210 is rotated, and for this reason, it is also called a rotator. At this time, the stator 120 may be fixed to a certain position as the outside of the rotor 110, and for this reason, it is also called a stationary core.

The rotor 110 may include a rotor core 111 formed in a cylindrical shape and having a plurality of rotor slots 111$b$ formed in the circumferential direction, and a plurality of magnets 112 inserted into the plurality of rotor slots 111$b$.

A first end plate 141 may be installed in a side surface (i.e. a side surface in the +X axis direction) of the rotor 110 opposite to a side facing the flywheel 220. A plurality of first coupling holes 141$a$ may be formed in the first end plate 141, and a plurality of first coupling pores facing the first coupling hole 141$a$ may be formed in a rotor core 111. In this case, the first end plate 141 and the rotor core 111 may be coupled to each other by screwing a screw to the rotor core 111 through the first coupling hole 141$a$ and the first coupling pore. Meanwhile, the screw fastening is described as an example as a method of combining two components distinguished from each other in the above and below, and furthermore, various coupling methods such as hook coupling, bonding, welding, etc. may be applied.

A second end plate 142 may be installed in a side surface (i.e. a side surface in the −X axis direction) of the rotor 110 facing the flywheel 220. A plurality of second coupling holes 142$a$ may be formed in the second end plate 142, and a plurality of second coupling pores facing the second coupling holes 142$a$ may be formed in the rotor core 111. In this case, the second end plate 142 and the rotor core 111 may be coupled to each other by screwing the screw to the rotor core 111 through the second coupling hole 142$a$ and the second coupling pore.

According to an embodiment, the first and second coupling pores may be a coupling pore 111$a$ formed through the rotor core 111 and integrally provided. The first and second end plates 141 and 142 may serve as a stopper preventing a magnet 112 inserted into the rotor slot 111$b$ from being separated from the rotor slot 111$b$.

The first end plate 141 may be formed in a ring shape having an inner diameter and an outer diameter respectively corresponding to the inner and outer diameters of the rotor core 111. The second end plate 142 may include a body of circular plate type whose diameter corresponds to the outer diameter of the rotor core 111.

The rotation shaft 210 may be coupled to a side surface of the second end plate 142 facing the flywheel 220 (i.e. a side surface in the −X axis direction). As an example, a plurality of shaft coupling holes 142$b$ may be formed in the body of circular plate type, and a plurality of coupling pores facing the coupling hole 142$b$ may be formed in the rotation shaft 210. In this case, the second end plate 142 and the rotation shaft 210 may be coupled to each other by screwing the screw to the rotation shaft 210 through the coupling hole 142$b$ and the coupling pore.

Accordingly, the power of the engine 200 may be transmitted to the rotor 110 through the rotation shaft 210 and the second end plate 142. That is, since the second end plate 142 also serves as a medium for transmitting power of the engine 200 in addition to preventing separation from the rotor slot 111$b$ of the magnet 112, it is preferable to secure rigidity by being formed to have a thickness greater than that of the first end plate 141.

The second end plate 142 may include a plurality of suction holes 142$c$ formed by penetrating the body of circular plate type in a direction corresponding to the longitudinal direction of the rotation shaft 210. In addition, when the rotation shaft 210 and the second end plate 142 are rotated, air outside the generator 100 may flow into the flywheel 220 through the suction hole 142$c$. To this end, the engine 200 may include a blade 230 which is installed in the side surface (i.e. the side surface in the +X-axis direction) of the flywheel 220 facing the rotor 110 and rotated together with the flywheel 220 when the rotation shaft 210 is rotated.

The blade 230 may be formed in the shape of a bent plate. Here, the direction and degree in which the blade 230 is bent may be determined according to the position of the suction hole 142$c$ and the rotation direction of the rotation shaft 210 to which the flywheel 220 is coupled. That is, the blade 230 may be formed to guide air flowed into the flywheel 220 from the outside of the generator 100 through the suction hole 142$c$ in a radially outward direction of the flywheel 220.

Meanwhile, the engine 200 may include an engine bracket 240 which has a through hole 241$a$ through which the rotation shaft 210 passes, and one side that is opened to accommodate the flywheel 220 therein, and is coupled to the stator 120. That is, the generator 100 may be coupled to one side of the engine 200 via the engine bracket 240. In addition, when the plurality of blades 230 are rotated, the engine bracket 240 forms a flow path of air that guides the air flowed into the flywheel 220 to the stator 120 through the inside of the rotor 110 and the suction hole 142$c$, which will be described in more detail later.

The engine bracket 240 may include a bracket body 241 and a plurality of connectors 242. The bracket body 241 may have one side (i.e. +X-axis direction side) that is opened and have the other side (i.e. −X-axis direction side) in which a through hole 241$a$ is formed. The bracket body 241 may form a certain space therein, and the flywheel 220 may be rotatably accommodated in the space. The side surface of the bracket body 241 may be formed to form an octagonal surface, but the shape of the bracket body 241 is not limited thereto. Each of the plurality of connectors 242 is formed to protrude from the inner side surface of the bracket body 241 toward the inner side, is coupled to the stator 120, and positioned to be spaced apart from each other by a certain distance in the circumferential direction of the bracket body 241.

Each of the plurality of connectors 242 includes an inflow port 242$b$ through which air blown from the plurality of blades 230 is introduced, and a discharge port 242$c$ for discharging the air introduced through the inflow port 242b to the stator 120. The inflow port 242b may be formed by penetrating the connector 242 in a direction corresponding to the radially outward direction of the flywheel 220, and air blown in the radially outward direction of the flywheel 220 may be introduced by a plurality of blades 230.

The discharge port 242c is formed by penetrating the connector 242 in a direction corresponding to the longitudinal direction of the rotation shaft 210, and communicates with the inflow port 242b, so that the flow direction of the air passed through the inflow port 242b may be changed to a direction (i.e. +X-axis direction) toward the stator 120 and the air is discharged.

In addition, the bracket body 241 is opened toward the stator 120, and the side surface (i.e. the side surface of the YZ direction) is formed perpendicular to the radially outward direction of the flywheel 220, so that among the air blown in the radially outward direction of the flywheel 220 by the plurality of blades 230, air that has not passed through the connector 242 may also be guided toward the stator 120.

The stator 120 may be coupled to the engine bracket 240 via the connector 242. The stator 120 may include a stator core in which a stator slot 120a which is wound around with a coil C is formed, and a stator yoke 121 and 122 which is positioned outside the stator slot 120a and forms an outer circumference of the stator 120. The connector 242 may have a coupling pore 242a to which the stator 120 is coupled, and the stator yoke 121 and 122 may have a coupling hole 121a coupled to the coupling pore 242a at a portion facing the connector 242. That is, the stator 120 and the engine bracket 240 may be coupled to each other by screwing a screw into the connector 242 through the coupling hole 121a and the coupling pore 242a.

That is, in the present disclosure, the generator 100 having the stator 120 can be coupled to the engine side without installing a separate support body in the stator 120. Therefore, there is an advantage in that the cost and time for separately manufacturing the support body can be saved and it is possible to prevent damage to the stator 120 caused during the process of installing the support body in the stator 120.

Figure 4:
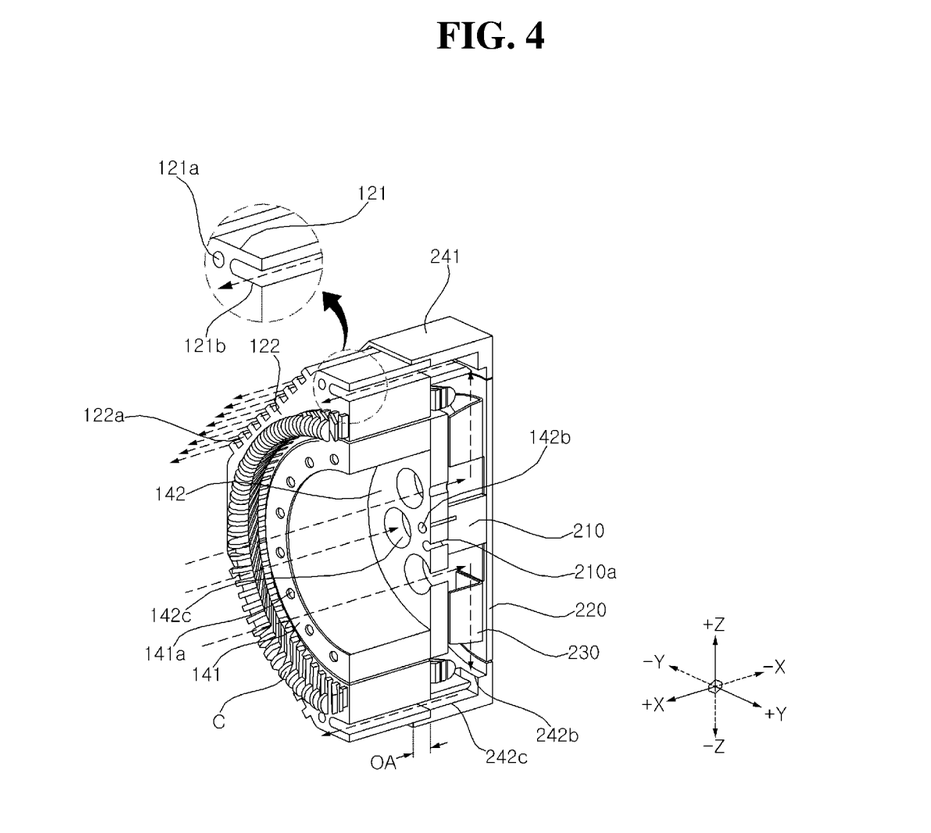
FIG. 4 is a cut-away perspective view showing a partial configuration of a generator coupled to one side of an engine according to a first embodiment of the present disclosure.

FIG. 4 is a cut-away perspective view showing a partial configuration of a generator coupled to one side of an engine according to a first embodiment of the present disclosure.

Referring to FIGS. 3 and 4, the stator 120 may form a path through which air supplied through the connector 242 flows. The stator yokes 121 and 122 may include a first yoke 121 and a second yoke 122. The first yoke 121 is a portion facing the connector 242, and a coupling hole 121a may be formed therein. The second yoke 122 may be a portion of the stator yoke excluding the first yoke 121.

In the first embodiment of the present disclosure, a yoke hole 121b that passes through the first yoke 121 in the longitudinal direction (i.e. the X-axis direction) and communicates with the discharge port 242c may be formed inside the first yoke 121. Thus, among the air blown in the radially outward direction of the flywheel 220 by the plurality of blades 230, the air that passed through the discharge port 242c of the connector 242 flows into the yoke hole 121b and then passes through the stator 120, thereby directly and effectively removing heat generated in the stator 120 during the operation of the generator 100.

In the first embodiment of the present disclosure, a plurality of fins 122a protruding outwardly may be formed on an outer surface of the second yoke 122. Each of the plurality of fins 122a is formed to extend in the longitudinal direction of the second yoke 122 (i.e. in the X-axis direction), and may be spaced apart from each other by a certain interval in the circumferential direction of the second yoke 122. Accordingly, among the air blown in the radially outward direction of the flywheel 220 by the plurality of blades 230, the air that has not passed through the connector 242 passes through a space formed between each of the plurality of fins 122a, so that the heat transfer area between the stator 120 and the cooling air may be increased during the operation of the generator 100.

The flow path of air for removing heat generated in the stator 120 is summarized with reference to the dotted arrows in FIG. 4 as follows. When the rotation shaft 210 is rotated, the flywheel 220 and the blade 230 are rotated together so that air may flow into the flywheel 220 through the suction hole 142c from the outside of the generator 100. Thereafter, the air flowed into the flywheel 220 may be blown in a radially outward direction of the flywheel 220 according to the rotation of the blade 230. Then, among the air blown in the radially outward direction of the flywheel 220, the air passed through the connector 242 passes through the yoke hole 121b to cool the stator 120, and then is discharged to the outside of the generator 100, and air that has not passed through the connector 242 may be discharged to the outside of the generator 100 after passing through the fins 122a to cool the stator 120.

Meanwhile, at least a portion of the outer surface of the first yoke 121 may be in contact with the inner surface of the bracket body 241, and at least a portion of the outer surface of each of the plurality of fins 122a may be in contact with the inner surface of the bracket body 241. That is, a part of the stator 120 may be inserted into the engine bracket 240 to form a certain overlapping portion OA. Accordingly, air blown in the radially outward direction of the flywheel 220 according to the rotation of the blade 230 may be guided to the yoke hole 121b and the fin 122a, respectively, without leaking to the outside. In addition, in this case, the overlapping portion OA is formed in front of the connector 242 (i.e. +X axis direction), so that the coupling of the stator 120 to the engine bracket 240 can be easily guided through the connector 242.

Figure 5:
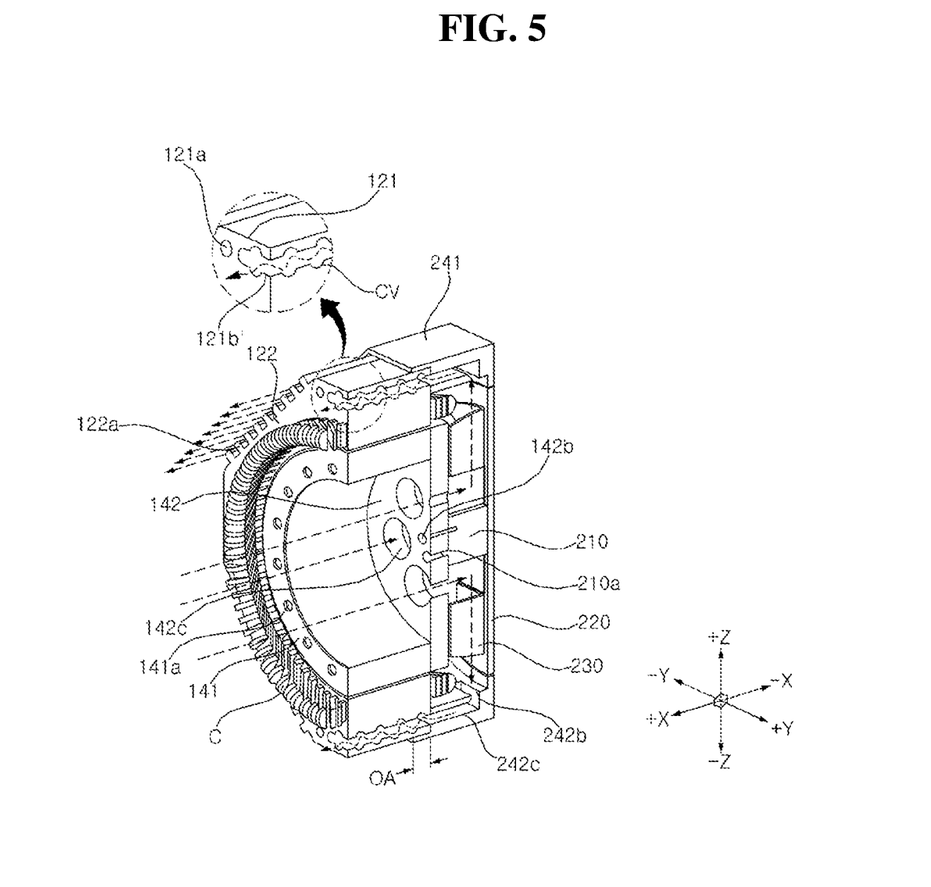
FIG. 5 is a cut-away perspective view showing a partial configuration of a generator coupled to one side of an engine according to a second embodiment of the present disclosure.

FIG. 5 is a cut-away perspective view showing a partial configuration of a generator coupled to one side of an engine according to a second embodiment of the present disclosure.

Referring to FIG. 5, in the second embodiment of the present disclosure, a plurality of concave portions or convex portions CV may be formed on a surface that partitions the yoke hole 121b'. In FIG. 5, it is shown that only the concave portion is formed among the plurality of concave portions or convex portions CV, but this is only an example, and only the convex portion or both the concave portion and the convex portion can be formed. As a plurality of concave portions or convex portions CV are formed on the surface partitioning the yoke hole 121b', the heat transfer area between the air passing through the yoke hole 121b' and the stator 120 is increased, and cooling performance may be improved in comparison with the case where the surface partitioned by the yoke hole is flat.

The cross section of the concave portion or the convex portion CV may be formed in a circular shape or an elliptical shape. When the cross section of the concave portion or the convex portion CV is formed in an elliptical shape, it may be formed in an elliptical shape longer in the longitudinal direction than in the width direction of the flow path of air passing through the yoke hole 121b'. Accordingly, it is possible to increase the heat transfer area between the cooling air and the stator 120 while minimizing obstruction of flow of air passing through the yoke hole 121b'.

Figure 6:
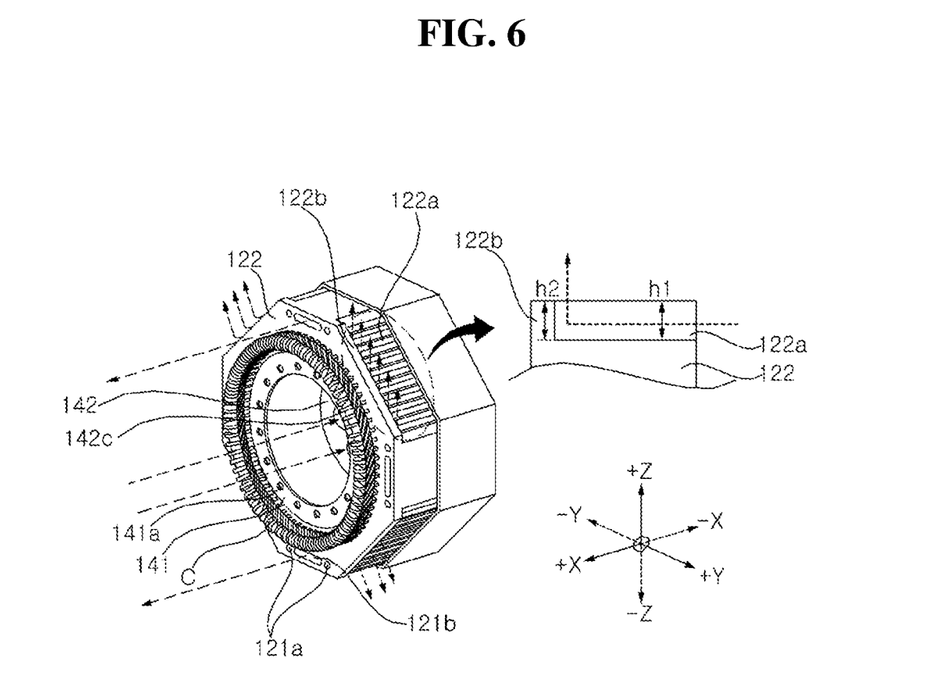
FIG. 6 is a perspective view of a generator coupled to one side of an engine according to a third embodiment of the present disclosure.
Figure 7:
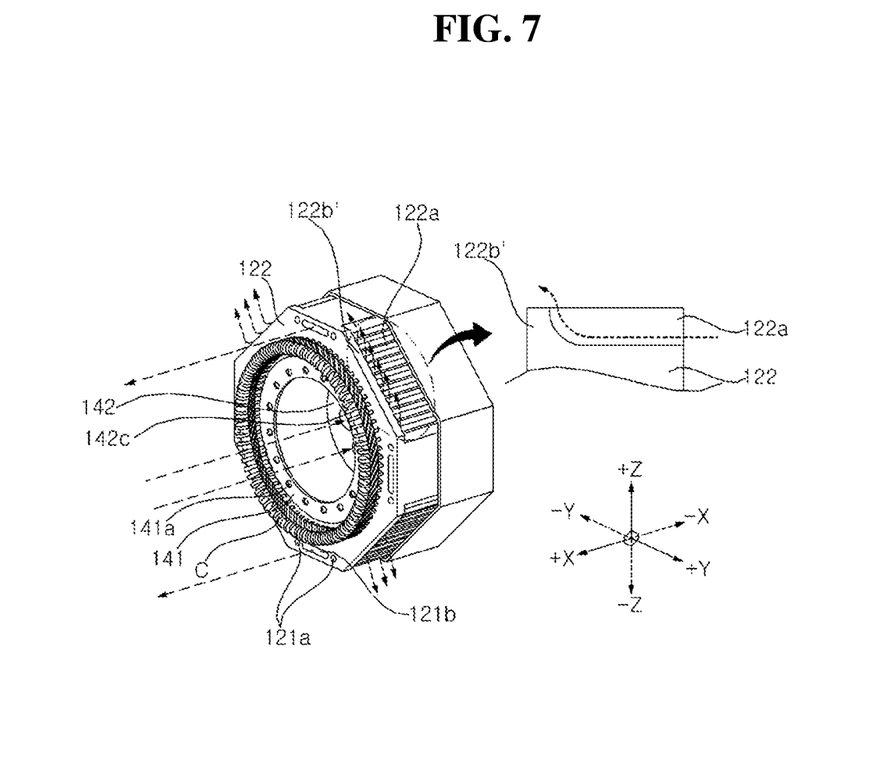
FIG. 7 is a perspective view of a generator coupled to one side of an engine according to a fourth embodiment of the present disclosure.

FIG. 6 is a perspective view of a generator coupled to one side of an engine according to a third embodiment of the present disclosure, and FIG. 7 is a perspective view of a generator coupled to one side of an engine according to a fourth embodiment of the present disclosure.

A path through which air (hereinafter, referred to as inflow air) that flows into the suction hole 142c and is used for cooling the stator 120 and a path through which air (hereinafter, exhaust air) that passed through the fin 122a and received heat energy from the stator 120 flows are adjacent to each other, so that there is a room for the exhaust air to flow back into the suction hole 142c together with the inflow air. And, in this case, the cooling performance of the stator 120 may be deteriorated. Accordingly, the present disclosure can prevent the exhaust air from re-inflow into the suction hole 142c by providing a protrusion 122b described later.

Referring to FIG. 6, in the third embodiment of the present disclosure, in addition to the fin 122a, a protrusion 122b protruding outward may be formed on the outer surface of the second yoke 122. One side surface (i.e. the side surface of the −X axis direction) of the protrusion 122b may be coupled to a side surface (i.e. the side surface of the +X axis direction) of the fin 122a opposite to the side surface toward the flywheel 220. The protrusion 122b may extend in the circumferential direction of the second yoke 122.

A protruding degree h2 of the protrusion 122b from the outer surface of the second yoke 122 is equal to or larger by a certain value than a protruding degree h1 of the fin 122a from the outer surface of the second yoke 122. As a result, the air passing through a space formed between each of the plurality of fins 122a in a direction (i.e. in the +X-axis direction) toward the outside among the length direction of the stator 120 is blocked by the protrusion 122b and thus the flow path of the air can be converted to the outside of the stator 120. Accordingly, it is possible to prevent the exhaust air from flowing back into the suction hole 142c together with the inflow air.

In the third embodiment of the present disclosure shown in FIG. 6, the side surface (i.e. −X-axis direction side surface) of the protrusion 122b facing the flywheel 220 is formed to be orthogonal to the outer surface of the second yoke 122, so that the direction of air flow can be rapidly changed.

In the fourth embodiment of the present disclosure shown in FIG. 7, the side surface (i.e. the side surface of the −X-axis direction) of the protrusion 122b' facing the flywheel 220 forms a curved surface with the outer surface of the second yoke 122, so that the flow direction of air is gently changed, and unnecessary eddy currents or flow disturbances in the conversion process can be prevented.

According to the present disclosure, there are one or more of the following effects.

First, the air introduced through the inside of the rotor to which the rotation shaft, which is the engine output shaft, is coupled is guided to the stator through the air flow path formed in the engine bracket, so that heat generated in the stator can be directly removed.

Second, heat generated in the stator can be directly and effectively removed, by causing a flow of air passing through the stator by a plurality of blades installed in the flywheel.

Third, since the connector provided in the inside of the engine bracket is coupled to the stator, a generator including the stator can be coupled to the engine side without installing a separate support body in the stator.

Fourth, a yoke hole through which air flowing by the blade passes is formed inside the yoke of the stator, so that the cooling performance of the stator may be improved.

Fifth, a plurality of fins are formed in the outside of the yoke of the stator to increase the heat transfer area between the air flowing by the blade and the stator.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A generator that converts mechanical energy transmitted through a rotational shaft perpendicularly coupled to a flywheel as an output shaft of an engine into electrical energy, the generator comprising:
   a rotor coupled to the rotational shaft and rotated together when the rotational shaft is rotated;
   a stator which has an inner surface positioned adjacent to an outer surface of the rotor and around which a coil is wound; and
   a first end plate coupled to a side surface of the rotor facing the flywheel and to which the rotational shaft is coupled, wherein the engine comprises:
      a plurality of blades formed at one side of the flywheel facing the first end plate and rotated together with the flywheel when the rotational shaft is rotated; and
      an engine bracket which has a through hole through which the rotational shaft passes, one side of which is open to accommodate the flywheel therein, and which is coupled to the stator, wherein the engine bracket forms an air flow path for guiding air flowing into the flywheel through an inside of the rotor to the stator, when the plurality of blades is rotated, and wherein the first end plate has a circular plate shape and comprises a plurality of suction holes formed through the first end plate in an axial direction of the rotational shaft.

2. The generator of claim 1, further comprising:
   a second end plate opposite to the first end plate with respect to the rotor and coupled to the rotor, wherein the rotor comprises:
      a rotor core formed in a cylindrical shape and having a plurality of rotor slots formed in a circumferential direction; and
      a plurality of magnets inserted into the plurality of rotor slots.

3. The generator of claim 2, wherein the second end plate has an inner diameter and an outer diameter that are formed respectively in a ring shape corresponding to each of the inner and outer diameters of the rotor core, and wherein the first end plate comprises:
   a body of a circular plate type a diameter of which corresponds to the outer diameter of the rotor core and comprising the plurality of suction holes so that the air flowing into the flywheel passes therethrough when the plurality of blades is rotated.

4. The generator of claim 3, wherein the first end plate has a thickness greater than a thickness of the second end plate.

5. The generator of claim 3, wherein the engine bracket comprises:
a bracket body, a first side of which is open and a second side in which the through hole is formed; and
a plurality of connectors that protrudes, respectively, from an inner surface of the bracket body toward the inside, is coupled to the stator, and is spaced apart from each other by a certain distance in a circumferential direction of the bracket body.

6. The generator of claim 5, wherein each of the plurality of connectors has a coupling pore to which the stator is coupled, an inflow port through which air blown from the plurality of blades is introduced, and a discharge port through which the air introduced through the inflow port to the stator is discharged.

7. The generator of claim 6, wherein the stator comprises:
a stator core having a stator slot around which the coil is wound; and
a stator yoke positioned at an outside of the stator slot and forming an outer circumference, wherein the stator yoke has a coupling hole which is coupled to the coupling pore formed at a portion facing the connector.

8. The generator of claim 7, wherein the stator yoke comprises:
a first yoke which is a portion facing the connector and has the coupling hole formed therein; and
a second yoke which is a portion excluding the first yoke, and wherein the first yoke has a yoke hole, formed therein, that passes through the first yoke in a longitudinal direction of the first yoke and communicates with the discharge port.

9. The generator of claim 8, wherein the second yoke includes a plurality of fins that protrudes outwardly formed on an outer surface thereof, and wherein each of the plurality of fins extends in a longitudinal direction of the second yoke and is spaced apart from each other by a certain interval in a circumferential direction of the second yoke.

10. The generator of claim 9, wherein at least a portion of an outer surface of the first yoke is in contact with an inner surface of the bracket body, and wherein at least a portion of an outer surface of each of the plurality of fins is in contact with the inner surface of the bracket body.

11. The generator of claim 9, wherein the second yoke includes a protrusion that protrudes outward formed on the outer surface, wherein a protruding degree of the protrusion from the outer surface of the second yoke is equal to or larger by a certain value than a protruding degree of the plurality of fins from the outer surface of the second yoke, and wherein one side of the protrusion is coupled to a side surface of the plurality of fins opposite to a side surface facing the flywheel and extends in a circumferential direction of the second yoke.

12. The generator of claim 11, wherein the side surface of the protrusion facing the flywheel is orthogonal to the outer surface of the second yoke.

13. The generator of claim 11, wherein the side surface of the protrusion facing the flywheel forms a curved surface with the outer surface of the second yoke.

14. The generator of claim 8, wherein the first yoke has a plurality of concave portions or convex portions formed on a surface partitioning the yoke hole.

15. The generator of claim 14, wherein the concave portion or the convex portion has a cross section formed in an elliptical shape longer in a longitudinal direction than in a widthwise direction of a flow path of air passing through the yoke hole.

* * * * *